Figures 1, 2:
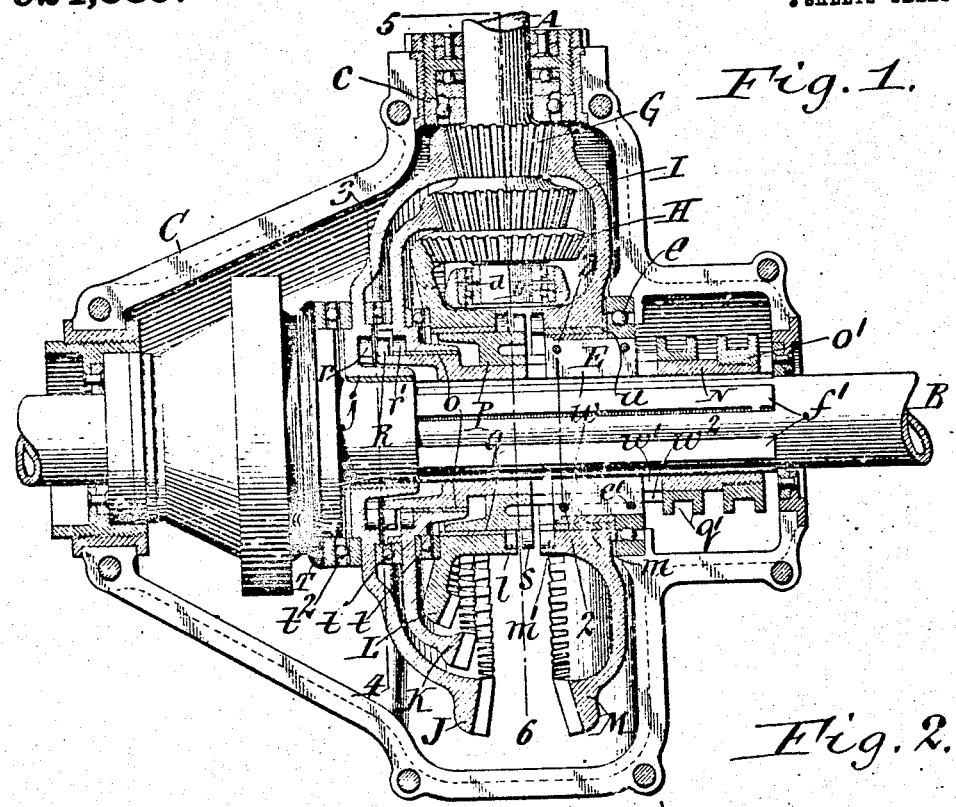

G. CHEDRU.
VARIABLE SPEED GEARING.
APPLICATION FILED JULY 16, 1907.

924,889.

Patented Jun. 15, 1909.
3 SHEETS—SHEET 1.

Witnesses:—
Richard Sommer
Gustav W. Hora

Inventor
G. Chédru
by Geyer & Popp
Attorneys

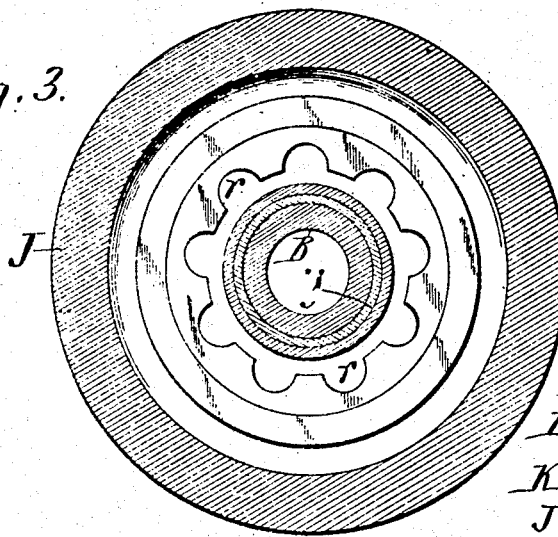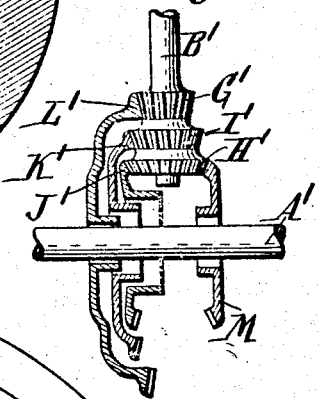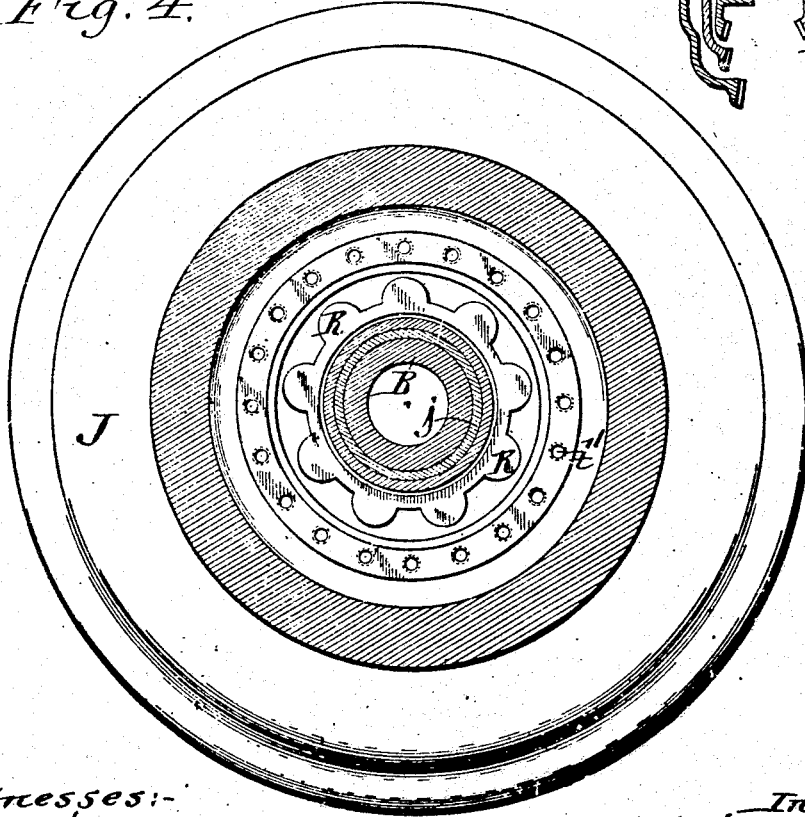

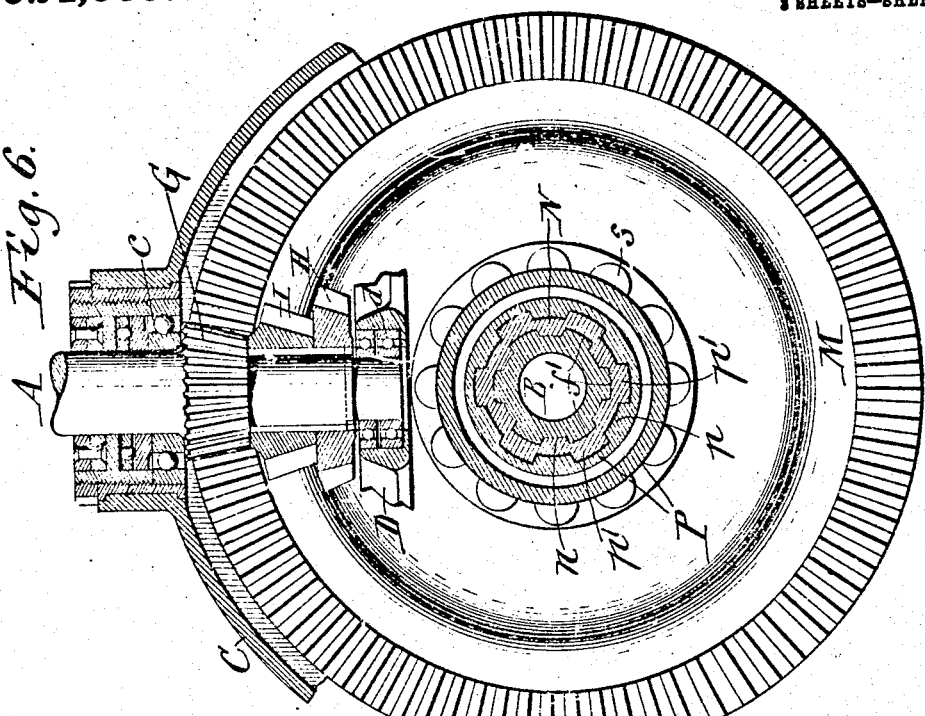
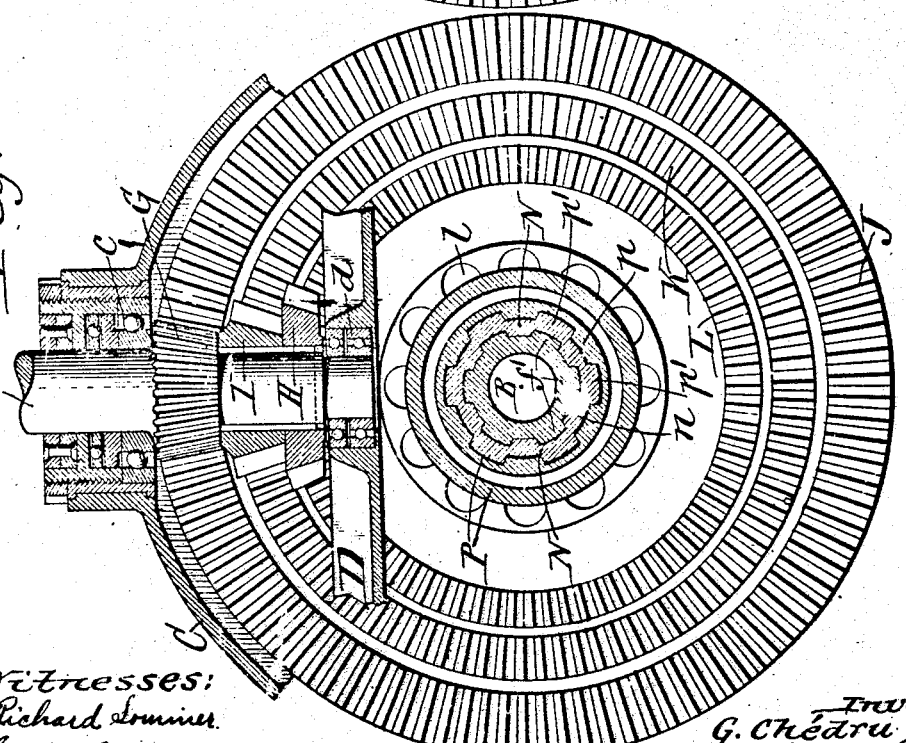

UNITED STATES PATENT OFFICE.

GUSTAVE CHÉDRU, OF BUFFALO, NEW YORK, ASSIGNOR TO E. R. THOMAS MOTOR COMPANY, OF BUFFALO, NEW YORK, A CORPORATION OF NEW YORK.

VARIABLE-SPEED GEARING.

No. 924,889.

Specification of Letters Patent.

Patented June 15, 1909.

Application filed July 16, 1907. Serial No. 384,010.

*To all whom it may concern:*

Be it known that I, GUSTAVE CHÉDRU, a citizen of France, residing at Buffalo, in the county of Erie and State of New York, have invented a new and useful Improvement in Variable-Speed Gearing, of which the following is a specification.

This invention relates to a variable speed gearing which is more particularly designed for use in automobiles but the same may also be used for other purposes in which variation and change of direction of speed or motion are required.

The object of this invention is the production of a simple, compact and efficient speed changing gearing in which all of the motions from the driving shaft to the driven shaft are transmitted directly, thereby reducing the number of parts through which the power is carried and minimizing the loss of power, the wear of parts and the noise accordingly.

In the accompanying drawings consisting of 3 sheets: Figure 1 is a longitudinal section of my improved variable speed gearing. Fig. 2 is a fragmentary transverse section of the same, on an enlarged scale, taken in line 2—2, Fig. 1. Figs. 3 and 4 are transverse sections, on an enlarged scale, taken in line 3—4, Fig. 1, and viewing the parts in opposite directions, respectively. Figs. 5 and 6 are transverse sections, on an enlarged scale, taken in line 5—6, Fig. 1, and viewing the parts in opposite directions respectively. Fig. 7 is a diagrammatic view, on a reduced scale, showing a modified construction of my invention.

Similar letters of reference indicate corresponding parts throughout the several views.

A represents the driving shaft or member and B the driven shaft or member which is arranged at right angles to the driving shaft and extends across the rear end of the latter.

C represents the casing or housing which incloses the variable speed gearing interposed between the driving and driven shafts. This casing is preferably divided in line with the center of the driving and driven shafts so as to permit of applying the casing to the speed gearing or removing the same therefrom without dismembering the entire gearing. One side of this casing is provided with a bearing $c$ of any approved construction in which the driving shaft is journaled between its front and rear ends. At its inner end the driving shaft is journaled in a bearing $d$ arranged on a cross piece D which is secured to the inner side of the casing. The driven shaft is journaled on the interior of the casing by means of the two sections E, E of a supporting collar and a ball bearing $e$ interposed between the outer side of said supporting collar and the inner side of the casing. The supporting collar is preferably divided diametrically and its parts are held in alinement by means of dowel pins $e^1$ passing transversely through coinciding openings in the sections thereof on opposite sides of the driven shaft, as shown in Fig. 2. In its bore this supporting collar is provided with longitudinal ribs $f$ which engage between similar longitudinal ribs $f^1$ on the periphery of the driven shaft, thus operating as a key connection between the collar and driven shaft which compels these parts to turn together.

G represents a small bevel pinion arranged on the front part of the driving shaft within the casing, H a large beveled pinion arranged on the rear part of the driving shaft within the casing, and I an intermediate bevel pinion arranged on the driving shaft between the small front pinion and the large rear pinion thereon. This set of different sized pinions may be formed either integrally with the driving shaft or made separate therefrom and secured thereto by keys or otherwise so as to turn with the driving shaft and form the driving pinions of the speed gearing.

J, K and L represent a set of different sized forwardly turning gear wheels arranged concentrically about the driven shaft on one side of the driving shaft and meshing with one side of the set of pinions. The large gear wheel J is journaled on a bearing $j$ formed on the driven shaft and meshes with the small pinion G, the intermediate gear wheel K is arranged adjacent to the inner side of the large gear wheel J and meshes with the intermediate pinion I and the small gear wheel L is arranged on the inner side of the intermediate gear wheel and meshes with the large pinion H, as shown in Fig. 1.

M represents a reversing gear wheel journaled on a bearing $m$ formed on the periphery of the supporting collar and meshing with the opposite side of one of the pinions, preferably the small pinion G, as shown in Fig. 1.

N represents an inner clutch sleeve which is mounted on the driven shaft so as to be capable of sliding lengthwise thereon but compelled to turn therewith. This is preferably effected by providing the bore of this sleeve with one or more longitudinal ribs $n$ which fit between the ribs $f^1$ of the driven shaft, as shown in Figs. 2, 5 and 6, and thus form a spline or feather connection between these parts. At one of its ends the inner clutch sleeve is provided with a cylindrical bearing $o$ on which the intermediate gear wheel K is journaled. The opposite end of this sleeve is provided with a shifting collar $o^1$.

P represents an outer clutch sleeve which is mounted on the inner clutch sleeve and provided in its bore with a plurality of longitudinal ribs $p$ which coöperate with similar ribs $p^1$ on the periphery of the inner clutch sleeve for producing a spline or feather connection between these sleeves, whereby they are permitted to slide lengthwise one relatively to the other but are compelled to turn with the driven shaft. At one end the outer clutch sleeve is provided with a cylindrical bearing $q$ on which the small gear wheel L is journaled and at its opposite end this sleeve is provided with a shifting collar $q^1$. The inner clutch sleeve is provided on its periphery adjacent to its bearing with an annular row of clutch teeth R which project outwardly between the hubs of the large and intermediate gear wheels. These hubs are provided on opposite sides of the teeth of the inner clutch sleeve with annular rows of clutch teeth $r$, $r^1$, respectively. When the inner clutch sleeve is in its central position, indicated in Fig. 1, its clutch teeth are arranged midway between the hubs of the large and intermediate gear wheels in which position neither of these wheels is coupled with the driven shaft. Upon shifting the inner clutch sleeve toward the left of the central position, its teeth will engage with those of the large gear wheel, thereby coupling the latter with the driven shaft and causing the power to be transmitted at slow speed directly from the driving shaft to the driven shaft by means of the small pinion, large gear wheel and inner clutch sleeve. Upon moving the inner clutch sleeve toward the right of its central position, its clutch teeth will be interlocked with those of the intermediate gear wheel, thereby causing the movement of the driving shaft to be transmitted at intermediate speed directly to the driven shaft by the intermediate pinion, intermediate gear wheel and inner clutch sleeve.

On the central part of the outer clutch sleeve the same is provided with an annular row of clutch teeth $s$ and the hubs of the small gear wheel L and reversing gear wheel M are provided with clutch teeth $l$, $m^1$ on opposite sides of the teeth on the outer clutch teeth. When the latter is in the central position, its teeth are arranged midway between those of the small forward turning gear wheel L and the reversing gear wheel M, as shown in Fig. 1. Upon shifting the outer clutch sleeve toward the left, its clutch teeth will engage those of the small forward turning gear wheel L and thereby transmit motion from the driving shaft at high speed directly to the driven shaft by means of the large pinion H, small gear wheel L, outer clutch sleeve P and inner clutch sleeve N. Upon moving the outer clutch sleeve toward the right, its clutch teeth engage with the clutch teeth of the reversing gear wheel, thereby causing the motion of the driving shaft to be transmitted directly to the driven shaft at slow speed and in a reversed direction by means of the small pinion G, the reversing gear wheel M, outer clutch sleeve P and inner clutch sleeve N.

It will be noted that this change speed gearing renders it possible to transmit the various speeds forward and backward directly from the driving shaft to the driven shaft, thereby avoiding carrying the power through idle gearing and reducing the wear, loss of power and noise which usually occurs in speed gearings which effect indirect transmission of power from the driving shafts.

The movement of the forward turning gear wheels toward the right is limited by the engagement of these wheels with their respective pinions but the movement of these wheels toward the left and the proper separation of the same is effected by means of three thrust bearings $t$, $t^1$, $t^2$ one of which is arranged between the hubs of the small and intermediate gear wheels, another between the hubs of the intermediate and large gear wheels and another between the hub of the large gear wheel and a shoulder or abutment the hubs of the intermediate and large gear wheel M is held against movement toward the left by engagement with the low speed pinion G but its motion toward the right is limited by engagement of its hub with a shoulder $u$ formed on the supporting collar. When the clutch teeth of the inner sleeve are disengaged from the teeth of the large and intermediate speed wheels and the teeth of the outer clutch sleeve are disengaged from the teeth of the small and reversing gear wheels, as shown in Fig. 1, the driving shaft rotates idly and no movement is transmitted from the same to the driven shaft. The shifting of the sleeves may be effected by a controlling mechanism of any approved construction which is connected with the collars $o^1$ and $q^1$ of said sleeves. This controlling mechanism of the speed changing gearing should be so constructed that it is impossible to engage the clutch teeth of the clutch sleeves with more than one gear wheel at a time, thereby preventing blocking of the gearing and possible injury to the same. The inner and outer clutch sleeves extend toward the right beyond the supporting collar E, E where the controlling mechanism may be more readily attached thereto but the supporting collar is mounted directly on the driven shaft. To permit of this, the supporting collar E, E is provided in its bore with a plurality of recesses $e$ forming bearing portions or lugs $e$ in the bore of the collar which engage with the periphery of the driven shaft and the inner and outer clutch sleeves are provided with coinciding longitudinal slots $w^1$, $w^2$ through which the lugs of the supporting collar project and leaving longitudinal bars or solid portions $w^3$, $w^4$ on said sleeves which extend through the recesses $e$ in the bore of the supporting collar. By this means the inclosing casing and the driven shaft engage directly with each other, thereby relieving the clutch sleeves from pressure of these parts, whereby these sleeves may be shifted readily and easily for obtaining the various changes in the rate and direction of motion.

If desired, this speed changing gearing may be so organized that the motion is transmitted by the same reversely from that just described. Such a reversal is shown in Fig. 7 in which A¹ represents the driving shaft, B¹ the driven shaft, G¹, H¹, I¹ the high speed, low speed and intermediate speed pinions, respectively, on the driven shaft, J¹, K¹, L¹ the high speed, intermediate speed and low speed gear wheels meshing with the corresponding pinions on one side thereof and M¹ the reversing gear wheel meshing with the low speed pinion H¹.

I claim as my invention:

1. A variable speed gearing comprising two shafts, a plurality of different sized pinions arranged on one of said shafts, a plurality of different sized forward turning gear wheels meshing with one side of said pinions, a reversing gear wheel meshing with the opposite side of one of said pinions, a sliding sleeve turning with the other shaft and provided with clutch teeth which are adapted to engage with clutch teeth on the opposite sides of two of the forwardly turning gear wheels, and a sliding sleeve also turning with said last mentioned shaft and having clutch teeth adapted to engage with clutch teeth on the opposing sides of another one of said forwardly turning gear wheels and said reversing gear wheel, substantially as set forth.

2. A variable speed gearing comprising two shafts, a plurality of different sized pinions arranged on one of said shafts, a plurality of different sized forward turning gear wheels meshing with one side of said pinions, a reversing gear wheel meshing with the opposite side of one of said pinions, an inner clutch sleeve splined on the other shaft and having clutch teeth which are adapted to engage with clutch teeth on the opposing sides of two of said forwardly turning gear wheels, and an outer clutch sleeve splined on the inner clutch sleeve and having clutch teeth adapted to engage with clutch teeth on the opposing sides of another of said forward turning gear wheels and said reversing gear wheel, substantially as set forth.

3. A variable speed gearing comprising two shafts arranged at an angle to each other, a plurality of different sized pinions meshing with one side of said pinions, a forwardly turning gear wheel meshing with one of said pinions and journaled on the other shaft, another forwardly turning gear wheel meshing with another one of said pinions, and a sleeve splined on the last mentioned shaft and having a bearing on which the last mentioned gear wheel is journaled, the opposing sides of said gear wheels having clutch teeth and said sleeve having teeth adapted to mesh with the teeth of said gear wheels; substantially as set forth.

4. A variable speed gearing comprising two shafts arranged at an angle to each other, a set of small intermediate and large pinions arranged on one of said shafts, a set of large, intermediate and small gear wheels meshing respectively with said pinions and each provided with clutch teeth, a bearing on the other shaft for said large gear wheel, an inner sleeve turning with the last mentioned shaft and having a bearing for the intermediate gear wheel, and provided with clutch teeth adapted to engage with teeth on the large and intermediate gear wheels, and an outer sleeve turning with the last mentioned shaft and having a bearing on which said small gear wheels are journaled, and provided with clutch teeth adapted to engage with the teeth on said small gear wheel, substantially as set forth.

5. A variable speed gearing comprising two shafts, a plurality of different sized pinions arranged on one of said shafts, a plurality of different sized forward turning gear wheels meshing with one side of said pinions, a reversing gear wheel meshing with the opposite side of one of said pinions, an inner clutch sleeve splined on the other shaft and having clutch teeth which are adapted to engage with clutch teeth on the opposing sides of two of said forwardly turning gear wheels, an outer clutch sleeve splined on the inner clutch sleeve and having clutch teeth adapted to engage with clutch teeth on the opposing sides of another of said forward turning gear wheels and said reversing gear wheel, and thrust bearings interposed between adjacent forward turning gear wheels and between one of said forward turning gear wheels and an abutment or shoulder on the shaft thereof, substantially as set forth.

6. A variable speed gearing comprising two shafts, a plurality of different sized pinions mounted on one of said shafts, a plurality of different sized gear wheels meshing with said pinions, a sliding clutch sleeve turning with the other shaft and provided with longitudinal slots, and with clutch teeth and adapted to engage with clutch teeth on adjacent gear wheels, an inclosing casing for the speed gearing, and a supporting collar journaled on the casing and having lugs in its bore which project through the slots of said sleeve into engagement with the shaft therein, substantially as set forth.

7. A variable speed gearing comprising two shafts, a plurality of different sized pinions mounted on one of said shafts, a plurality of different sized gear wheels meshing with said pinions, a sliding clutch sleeve turning with the other shaft and provided with longitudinal slots, and having clutch teeth adapted to engage with clutch teeth on adjacent gear wheels, an inclosing casing for the speed gearing, a divided supporting collar having its sections embracing said sleeve and journaled in a bearing on said casing, and dowels arranged on said sections on opposite sides of the sleeve, said collar having lugs projecting from its bore through the slots in the sleeve into engagement with the shaft therein, substantially as set forth.

8. A variable speed gearing comprising two shafts arranged at an angle to each other, a set of small, intermediate and large pinions arranged on one of said shafts, a set of forward turning large intermediate and small gear wheels meshing with one side of said pinions, respectively, a reversing gear wheel meshing with the opposite side of one of said pinions, a bearing on the other shaft for said large gear wheel, an inner sliding sleeve turning with the last mentioned shaft and provided with longitudinal slots and with a bearing for said intermediate gear wheel, and with clutch teeth adapted to engage with clutch teeth on the large and intermediate gear wheels, an outer clutch sleeve turning with the last mentioned shaft and provided with a bearing for the small gear wheel and with longitudinal slots which register with those of the inner sleeve, and with clutch teeth adapted to engage with clutch teeth on said small gear wheel and said reversing gear wheel, and a supporting collar surrounding the outer sleeve and having a bearing for said reversing gear wheel, and having lugs projecting from its bore through the slots of said sleeves into engagement with the shaft within the inner sleeve, substantially as set forth.

Witness my hand this 15th day of July, 1907.

GUSTAVE CHÉDRU.

Witnesses:
JOHN KRUCHTEN,
E. R. THOMAS.